United States Patent [19]

Mueller et al.

[11] Patent Number: 4,950,118
[45] Date of Patent: Aug. 21, 1990

[54] SYSTEM FOR LOADING AND UNLOADING TRAILERS USING AUTOMATIC GUIDED VEHICLES

[75] Inventors: William R. Mueller, Mentor; John E. Wible, Painesville; Richard A. Nestoff, Cuyahoga, all of Ohio

[73] Assignee: Caterpillar Industrial Inc., Mentor, Ohio

[21] Appl. No.: 327,196

[22] Filed: Mar. 22, 1989

[51] Int. Cl.⁵ .............................. B65G 67/02
[52] U.S. Cl. ..................... 414/274; 180/167; 414/275; 414/343
[58] Field of Search ............ 414/273, 274, 275, 398, 414/340, 343, 345; 180/167, 169

[56] References Cited

U.S. PATENT DOCUMENTS 3,071,262  1/1963  Bosch et al. ..................... 414/273
4,764,078  8/1988  Neri ................................ 414/273

FOREIGN PATENT DOCUMENTS 22731  1/1989  Japan ............................ 414/340

Primary Examiner—Sherman D. Basinger
Attorney, Agent, or Firm—Alan J. Hickman

[57] ABSTRACT

A system using free ranging automatic guided vehicles (AGVs) for loading and unloading material from a number of trailers is provided. The system employs a plurality of sensors for monitoring both pedestrian, operator driven vehicles and other AGV traffic, and for ensuring that the trailers are parked in position and ready for loading and unloading. The system further includes signals for controlling traffic and a plurality of trailer mounted targets for AGV navigation. During an operation cycle full containers are unloaded from a first trailer and empty containers are loaded on a second trailer.

20 Claims, 5 Drawing Sheets

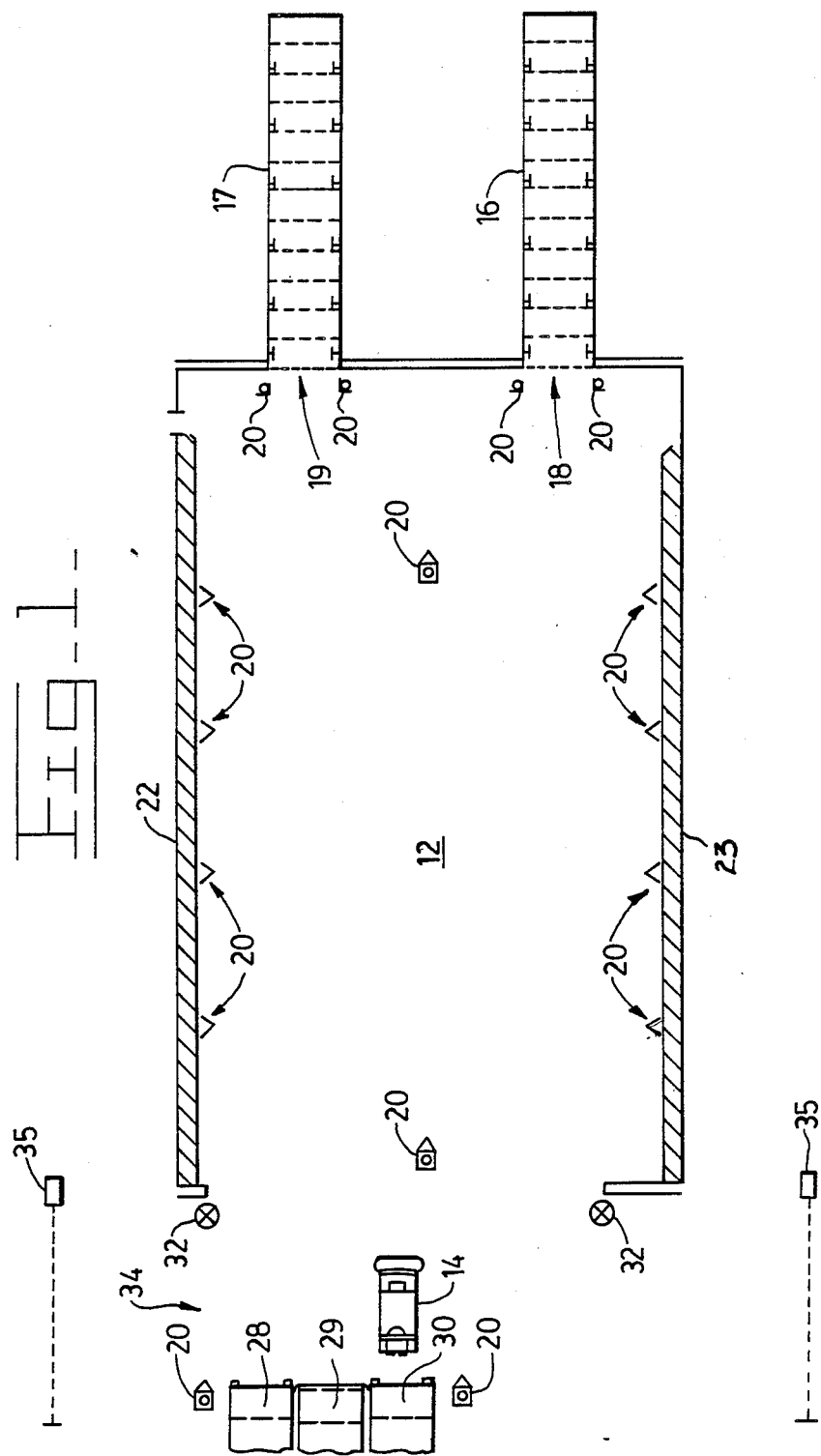

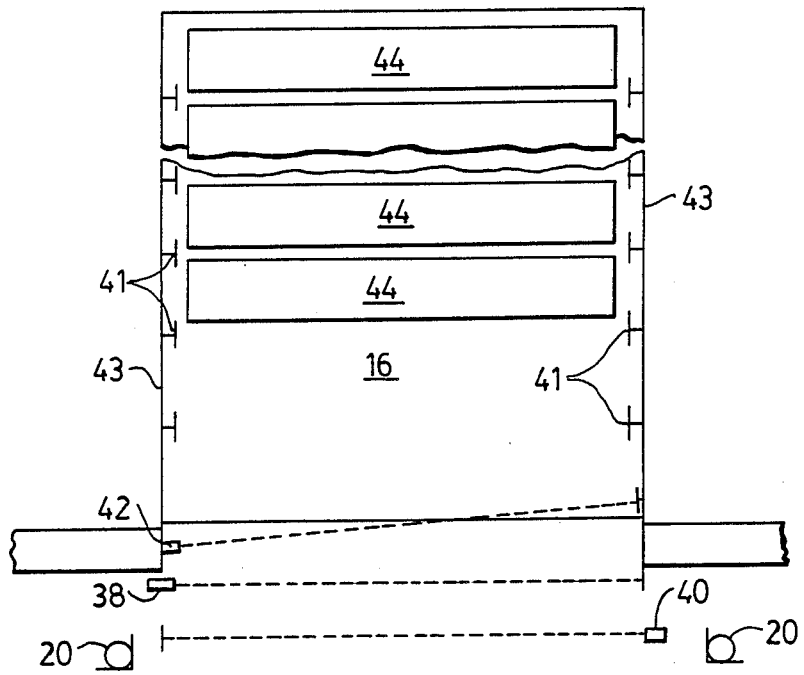
Fig_2A_
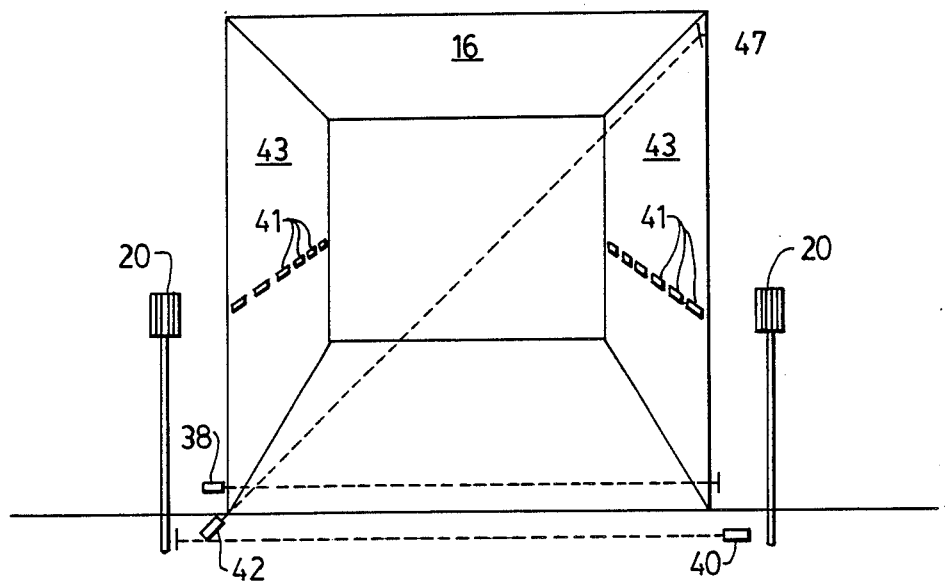
Fig_2B_

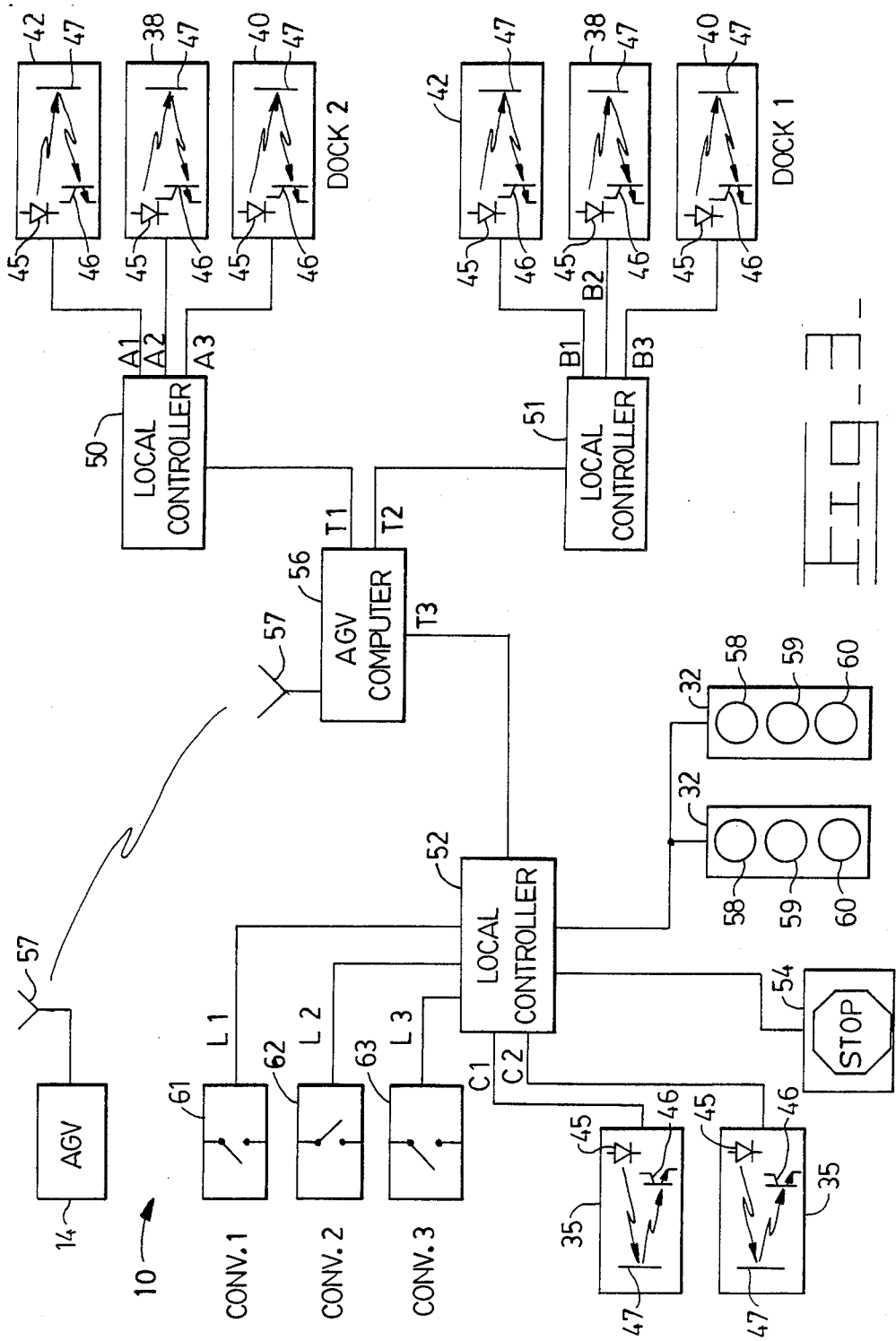

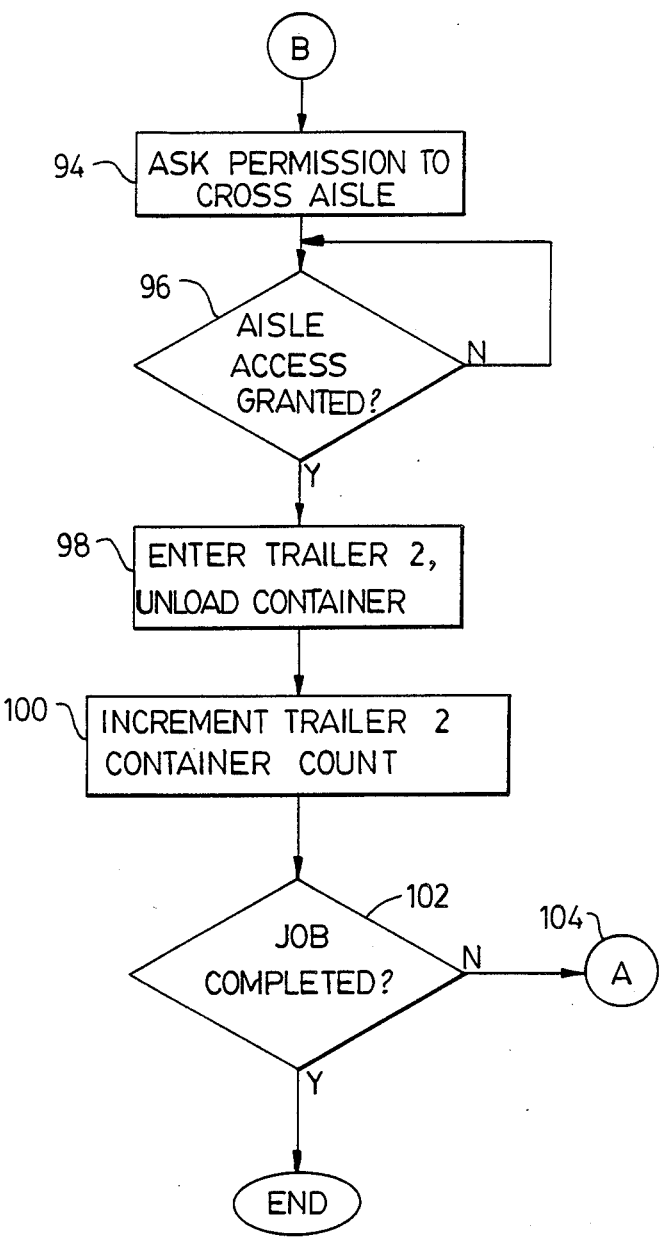
Fig_4B_

SYSTEM FOR LOADING AND UNLOADING TRAILERS USING AUTOMATIC GUIDED VEHICLES

TECHNICAL FIELD

This invention relates generally to the field of material handling and more particularly, to the field of material handling using automatic guided vehicles.

BACKGROUND ART

Automatic guided vehicles (AGVs) are well known in the field of material handling systems. AGVs generally navigate by following reflective tape or energized wires installed along the path of the AGVs. One particular type of AGV uses a laser beam to sight unique landmarks such as bar code targets and using triangulation determines the present location. Such AGVs capable of operating without the need for reflective tape or energized wires, such as the laser guided AGV discussed above, are called free ranging AGVs.

Development over the years has expanded the capabilities of the AGV, and greatly increased its utility and flexibility. As a result an AGV is capable of operating in more material handling applications than ever before. One typical material handling task previously restricted to an operator driven material handling vehicle is the loading and unloading of truck trailers. The present invention allows AGVs to load and unload trailers, or any mobile structure not fixed to a location.

Free ranging AGVs have a definite advantage over the AGVs which follow reflective tapes or energized wires when used in the truck trailer loading application. The reflective tape which is used as a guidepath for the AGV, is adhered to the docking bay floor and the trailer bed. Because the tape guidepath must be generally continuous, the trailer bed segment of the reflective tape must be aligned with the tape segment on the dock platform to form an unbroken path. This limitation requires an excessive number of trailer parking manipulations and adjustments to align the segments of the path. Further, the reflective tape is easily damaged or soiled by traffic, which is not tolerated by the AGV optical guidance system.

The guidewire method of vehicle guidance has generally the same alignment problems as the optical tape method in addition to installation and feasibility problems. This method required installing a wire in the trailer bed and providing a means of energizing it.

The instant invention is directed toward the loading and unloading of truck trailers or any mobile structure that is not fixed in location or is not a permanent part of the facility with an AGV.

DISCLOSURE OF THE INVENTION

The object of the invention is to provide an system and a method for loading and unloading trailers or any mobile structure autonomously with automatic guided vehicles (AGVs).

In one aspect of the invention, a system for loading and unloading a mobile structure is provided. The loading and unloading is performed by at least one automatic guided vehicle (AGV). The system comprises means for detecting said mobile structure being in position and arranged and oriented for said loading and unloading, means for navigating said AGV inside said mobile structure, means for monitoring traffic and delivering a signal in response to unauthorized traffic being present, and means for halting said AGV in response to receiving a signal from said traffic monitoring means.

In another aspect of the invention, a system for loading material into a second trailer and unloading material from a first trailer and transferring said material between at least one pick-up and drop-off location spaced from said first and second trailers is provided. The first and second trailers are parked at first and second docks respectively, and the loading and unloading tasks are performed by at least one automatic guided vehicle (AGV). The AGV navigates by sighting a plurality of unique landmarks and is controlled by a computer. The system comprises means for detecting the first and second trailers being parked at the first and second loading docks. Additionally traffic is monitored and controlled. Provision is also made for detecting absence and presence of material at the pick-up and drop-off location. A controller accounts for the amount of material in the first and second trailers and directs the AGV to transfer material in response to the presence of signals received from the trailer detecting means, the material detecting means and the absence of a signal being received from the monitoring means.

In another aspect of the invention, a system for loading material into a second trailer and unloading material from a first trailer and transferring said material to and from at least one pick-up and drop-off location outside of spaced from said first and second trailers is provided. The first and second trailers are parked at first and second docks respectively, and the loading and unloading tasks are performed by at least two automatic guided vehicles (AGVs). The preferred embodiment of the AGVs navigate by sighting a plurality of unique landmarks under the control of a computer. The trailers also include a plurality of unique landmarks to provide guidance for AGV navigation. The system comprises means for detecting the first and second trailers being parked at the first and second docks. Pedestrian, operator driven vehicle and AGV traffic is monitored and controlled continuously. The AGV has priority access to areas traveled by pedestrians and any other traffic. Unauthorized entry into the trailers is also detected. Provision is also made for detecting the absence and presence of material at the pick-up and drop-off location, and for accounting the amount of material in the first and second trailers by incrementing and decrementing the amount of material loaded and unloaded. A controller accounts for the amount of material in the first and second trailer and directs the AGVs to transfer material in response to the detecting means, monitoring means.

In yet another aspect of the invention, a method for loading material into a second trailer, unloading material from a first trailer and transferring said material to and from at least one pick-up and drop-off location outside of said first and second trailers is provided. The first and second trailers are parked at first and second docks respectively, and the loading and unloading is performed by at least one automatic guided vehicle (AGV). The AGV navigates by sighting a plurality of unique landmarks and is controlled by a computer. The steps of the method comprises detecting the first trailer being parked at the first dock, and the second trailer being parked at the second dock. Continuously monitoring and controlling traffic. Detecting the absence and presence of material at the pick-up and drop-off locations, and accounting for the amount of material in said first and second trailers. Directing the AGV to transfer material in response to the outputs of the detecting means, and monitoring means.

Thus, free ranging AGVs of the type previously discussed are preferred for loading and unloading mobile structures. However, other types of free ranging AGVs may be adapted to overcome the aforementioned disadvantages in order to perform trailer loading applications.

The invention also includes other features and advantages which will become apparent from a more detailed study of the drawings and specification.

BRIEF DESCRIPTION OF THE DRAWING

For a better understanding of the present invention, reference may be made to the accompanying drawings, in which:

FIG. 1 is a diagrammatic top plan view of an embodiment of the present invention disclosing a facility in which an AGV is provided for loading and unloading trailers parked at a loading dock;

FIG. 2A is a diagrammatic detailed top plan view of the loading dock showing a loading dock parked trailer in greater detail;

FIG. 2B is a diagrammatic detailed front view of the loading dock and loading dock parked trailer of FIG. 2A;

FIG. 3 is a block diagram of the loading dock area control system;

FIGS. 4A and 4B are a flowcharts describing the method of operation of the control system of FIG. 3.

BEST MODE FOR CARRYING OUT THE INVENTION

Figure 4A:
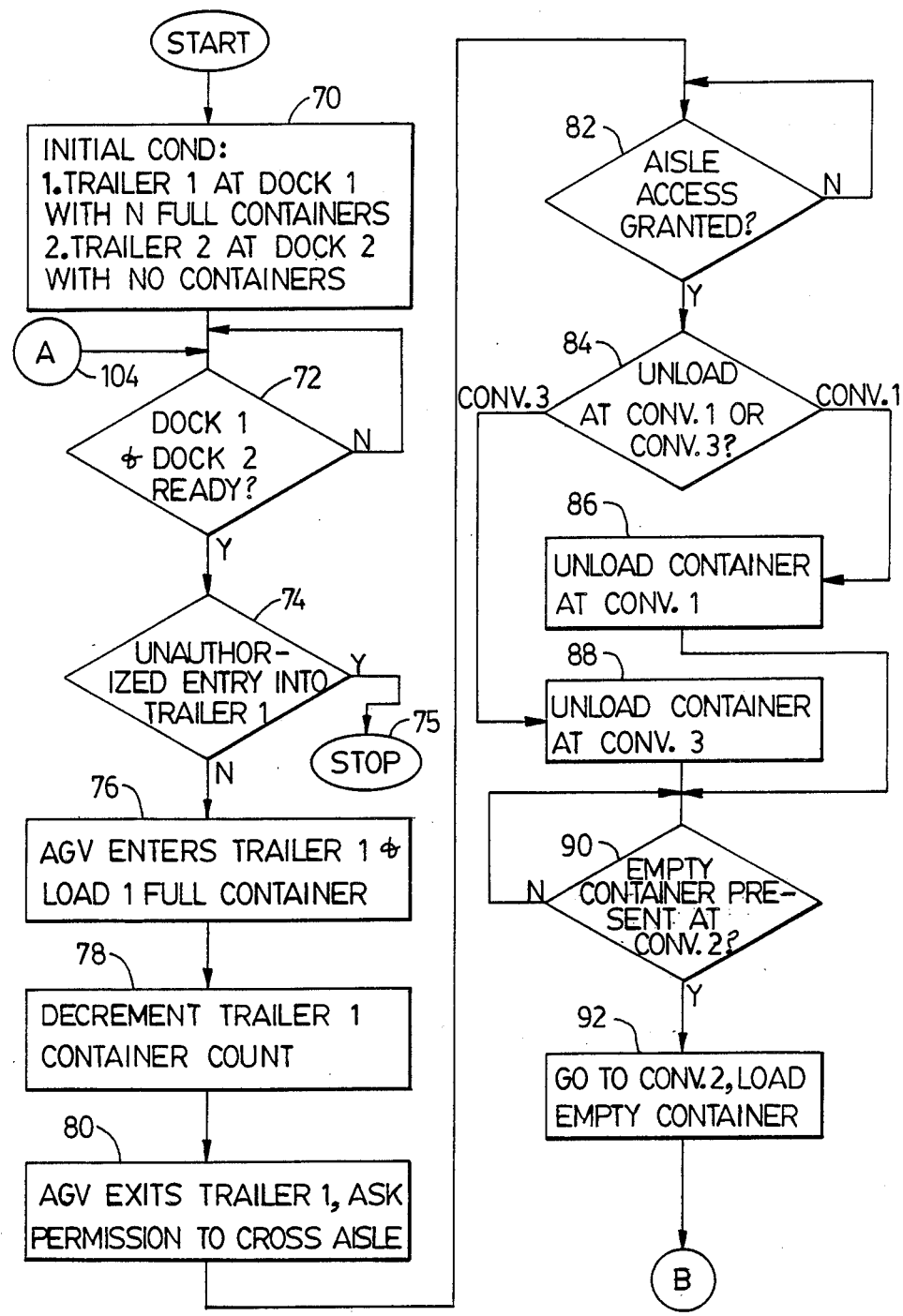

Referring to FIG. 1, a top plan view of a facility near trailer loading dock entrances is shown. FIG. 1 illustrates but one embodiment of the loading dock and a conveyor arrangement. As one may appreciate, other configurations are equally applicable and may be substituted for the embodiment shown. Although more than one AGV 14 may be used in this application, for the purpose of illustration, only one AGV 14 is shown. The AGV 14 is of the free ranging type, and navigates by deadreckoning and sighting a plurality of unique landmarks or targets 20. Free ranging AGVs of this type are well known in the art and will not be discussed structurally in any greater detail. First and second trailers 16,17 are parked in position at first and second loading docks 18,19. A plurality of navigational targets 20 line the first and second spaced apart walls 22,23, which define the area 12 in which the trailer loading AGVs 14 operate. The boundary of area 12 may be real and defined by walls 22,23 or imaginary, as the targets 20 may be affixed to the walls or attached to free-standing posts at predetermined distances apart. At the other end of the trailer loading AGV operating area 12 (opposite the loading docks 18,19) are first, second and third conveyors 28,29,30. The conveyors may be of the roller type or belt type. In the present embodiment, conveyors 28,30 are configured as AGV load deposit conveyors; its direction of load transfer being away from the AGV trailer loading operating area 12 to another area within the facility (not shown). Conveyor 29 is configured as an AGV load pick-up conveyor; its direction of load transfer being toward the AGV trailer loading operation area 12 and onto the AGV. Load sensing sensors 61,62 63 are installed on each of the conveyors 28,29,30, to detect the presence of a load (not shown) to be picked up or a load which has been deposited. These load sensing sensors 61,62,63 can be optical or mechanical switches, or weight sensitive devices. Located near the conveyors 28,29,30 are more navigational targets 20. As shown in FIG. 1, an aisle 34 separates the dock loading area 12 and the conveyors 28,29,30. This aisle 34 is a common traffic area and may be traveled by pedestrians, operator driven machinery, as well as AGVs doing other tasks. Traffic signal lights 32, situated in the aisle near the entrance of the aisle 34, direct pedestrian and operator driven vehicle traffic. The truck loading AGV 14 has top priority in aisle access and pedestrian traffic is controlled by the traffic signal 32. Pedestrians and operator driven vehicles are to proceed into the aisle 34 only when the signal lights are green. AGV traffic and particularly AGV traffic not associated with trailer loading and unloading is monitored by two light beam sensors 35 guarding the entry ways into the aisle 34 of the trailer loading area 12. The light beam sensor 35 delivers an infrared beam across the entry way of the aisle 34 and receives a reflection of the infrared beam at a receiver of the sensor. The absence of the reflected beam at the receiver of the sensor 35 signifies an object entering the aisle 34. In the embodiment shown in FIG. 1, a light beam sensor 35 is located at each end of the aisle 34. When a non-trailer-loading AGV (not shown) is detected after the trailer loading AGV 14 has requested entry into the aisle, the non-trailer-loading AGV is stopped to allow the trailer loading AGV 14 to proceed. A means for stopping the non-trailer-loading AGV can be a physical barrier (not shown) placed in front of the AGV or a halt command sent by a controlling computer (not shown).

FIG. 2A shows a more detailed top view of the loading dock area 12 and one of the trailers 16 partially loaded with material packaged in containers 44. It can be appreciated that the embodiment shown in FIG. 2A is equally applicable to the other trailer 17 and loading dock 19. Two light beam sensors 38,40 located at the entrance of the trailer 16 detects unauthorized entry into the trailer 16. The spacing between the two light beam sensors is such that an AGV entering the trailer will break both light beams delivered by the sensors 38,40 at one time. The detection of any traffic that does not break both beams of the light beam sensors 38,40 at one time stops the operation of the trailer loading AGV 14. Also, since an AGV computer 56 (see FIG. 3) controls the AGV loading operation, detection of unscheduled entry also halts the AGV 14. These traffic monitoring means warrant that the AGV 14 is operating in known conditions. A plurality of navigational targets 41 line both sides of the trailer walls 43 to aid in guiding the AGV 14 inside the trailer 16. The AGV 14 has the ability to align itself relative to the trailer 16 by sighting the targets 41 inside the trailer, even if the trailer is parked slightly askew with respect to the loading dock bay. The targets 41 are flat and do not interfere with the moving AGV 14. A third light beam sensor 42 is positioned to deliver a light beam to penetrate the opening or entry way of the trailer 16. As shown in FIG. 2B, the light beam sensor 42 which is mounted in the facility is diagonally aimed toward a reflector 47 positioned just inside the trailer entrance near the top of the trailer 16. The absence of the reflected beam at the sensor 42 signifies the trailer 16 not parked in position, the trailer doors closed, or the loading dock door closed. This sensor 42 input (to the computer 56) is checked prior to start up of the system and continuously monitors the trailer 16 thereafter to ensure three of the system requirements —trailers parked in place, trailer doors open, and dock doors open, are met. Other sensors may be installed for further assurance that the aforementioned conditions are met. For example, installing proximity switches at the loading docks 18,19 to detect the presence of the trailers 16,17, and installing alignment sensors at the end of the loading docks 18,19 to detect trailer gross misalignment. These sensors are not shown in the drawings but can be included without departing from the spirit of the present invention.

Referring to FIG. 3, a control system 10 for loading trailers with an AGV. The AGV computer 56 delegates tasks to the AGV 14. Computer 56 accepts inputs from the sensors 38,40,42 positioned at the loading docks 18,19 (DOCK1, DOCK2), the sensors 35 in the aisle 34, and the sensors 61,62,63 at the conveyors 28,29,30 (CONV 1, CONV 2, CONV 3). The preferred embodiment of the AGV system 10 utilizes a radio link 57 for communication and data transfer between the AGV 14 and the AGV computer 56. Local controllers 51,50 each monitors and controls the conditions at the loading docks 18,19 (DOCK1, DOCK2), respectively. At each loading dock there are three light beam sensors 38,40,42 each consisting of an optical emitter 45, an optical detector 46, and a reflector 47. The emitters 45 and detectors 46 can be visible light or infrared devices. These light beam sensors 38,40,42 are commercially available. The light beam sensors 38,40,42 generate a signal when the light beam is returned by the reflector 47 and received by the detector 46. The species of light beam sensors 38,40,42 previously discussed may be substituted for by an emitter 45 which delivers a light beam directly to a detector 46 spaced from the emitter 45. Such a substitution will eliminate the need for the reflector 47. The local controller 50 receives signals A1-,A2,A3 from sensors 42,38,40 of DOCK2 and the local controller 51 receives signals B1,B2,B3 from the sensors 42,38,40 of DOCK1. The local controllers 50,51 inform the AGV computer 56 according to the state of the sensor signals received. Signals B1 and A1 being set (on) signifies that DOCK1 and DOCK2 are ready, while signals (B2 AND B3) and (A2 and A3) being reset (off) signifies an AGV 14 is entering DOCK1 and DOCK2, respectively. An unauthorized entry is detected by any of A2-A3 and B2-B3 signals being reset while no AGVs are scheduled to enter the trailers. Further, if A3 is reset while A2 is not (the two beams are not broken at one time), there is also an unauthorized entry by an object that is not an AGV.

A third local controller 52 monitors and controls traffic in the aisle 34. The light beam sensors 35 which sense objects entering the aisle 34 also consisting of emitters 45, detectors 46, and reflectors 47 emit light beams at the entrance of the aisle 34. Signals C1 and C2 delivered from sensors 35 are received at the local controller 52. Additionally, traffic signals 32 are positioned strategically in the aisle to alert pedestrian and operator driven vehicles of oncoming AGV traffic. The preferred traffic signals 32 are of the conventional type with red, yellow, and green lights 58,59,60. Alternative traffic signals can be a single flashing or steady light signalling stop. Means 54 for stopping non-trailer-loading AGVs can be a physical barrier (not shown) or an issued command by the controller, depending on the implementation of the AGV system. The stop sign 54 in FIG. 3 is illustrated to symbolize such means 54. The local controller 52 monitors the aisle 34 traffic with the light beam sensors 35, and controls traffic flow with the traffic signals 32 and stopping means 54. Conveyors 61,62,63 (CONV1, CONV2, CONV3) are fitted with load sensing devices such as proximity switches, mechanical load weight switches, or optical type switches. Signals L1, L2, and L3, delivered from the load sensing devices 61,62,63, respectively, inform the local controller 52 if there is a load present at the conveyors 61,62,63 ready to be picked up.

Referring to FIG. 3 and FIG. 4, a flow chart describing operation of the control system 10 of FIG. 3. The initial conditions listed in block 70 are required at the start of the AGV trailer loading operation in the present embodiment. These conditions are: trailer 16 (trailer 1) parked at DOCK1 with N (number of) full containers and trailer 17 (trailer 2) parked at DOCK2 with no containers 44. The number N is a constant, for a given application, which is determined by the size of the trailer being loaded or unloaded and the size and shape of the containers 44. The system 10 can be upgraded by enabling the contents of each trailer to be user programmable. Next, the readiness of DOCK1 and DOCK2 are checked by detecting the state (on or off) of signals B1 and A1, respectively. If the docks 18,19 are ready, i.e., the trailer(s) 16,17 is in position and the doors of the loading docks 18,19 of the facility and the trailer doors are open, the states of the signals A2-A3 and B2-B3 are checked to detect illegal entry. The occurrence of any entry into the trailers 16,17 must be in accordance with the timing and scheduling of the AGVs 14. Further, the spacing of the light beams at the entrance of the trailers is such that B2 and B3 or A2 and A3 are true (set) at one time when an AGV 14 enters the trailers 16,17. In the case the entry of any object smaller than an AGV 14, the above conditions will not be true. If any unauthorized entry is detected at this point, the AGVs 14 are halted. Otherwise, the AGV 14 enters the first trailer 17 (trailer 1), picks up one load 44 and proceeds towards the conveyors for drop off of the load 44. At this time the material count for trailer 1 is decremented by one. Before the AGV 14 crosses the aisle 34, it requests for permission to access the aisle 34. Aisle access is granted to the AGV 14, if no other AGV is detected to have entered the area by the light beam sensors 35. When the AGV 14 is allowed aisle 34 access, traffic controlling means 32,54 signals pedestrians, vehicle operators, and other AGVs 14 to stop. In block 84, the AGV 14 crosses the aisle 34 and is instructed by the AGV computer 56 as to which conveyor 28,30 is to receive the load 44. The choice is established by either a preestablished material handling schedule or conveyor 28,30 availability. The AGV 14 then proceeds to pick up an empty container 44 at the third conveyor 29 if one is available. The availability of the empty container is detected by the load sensor 62 on the conveyor 29. After the load 44 is picked up at the conveyor 29, the AGV 14 again asks for permission to cross the aisle 34, and proceeds to trailer 17 (trailer 2) to deposit the load 44. Before the AGV 14 enters the trailer 17, unauthorized entry of the trailers 16,17 is again checked. Then the container count in the second trailer 17 is incremented to reflect the latest deposit. The operation is complete when the number of containers 44 in trailer 1 is zero, and the number in trailer 2 is N. Therefor, the container 44 counts are checked by the AGV computer 56 to determine if the job is completed. The loading/unloading cycle is continued until the above conditions are satisfied.

Although the previous description referred to the AGV 14 primarily in the singular, the preferred embodiment utilizes at least two AGVs 14. The system 10 is also flexible and expandable to include more than two trailers and more than three conveyors.

Industrial Applicability

The operation of the present invention is best described in relation to its use in the trailer loading and unloading applications as disclosed in the Figs. Traditionally, automatic guided vehicles (AGVs) 14 are used for material handling applications inside a facility where the layout is somewhat permanent and the type of load 44 being handled is substantially consistent in size and shape. The present invention overcomes the problems associated with such material handling applications.

The system 10 can be started up by an operator or by detecting that both trailers 16,17 to be unloaded and loaded are in position at the docks 18,19 and ready for the operation. Once the system 10 is started, the AGVs 14 proceed to move material until all material is unloaded and the empty containers 44 used to house the material is loaded into the other trailer 16,17. The unloaded material is transferred by the AGVs to one of two conveyors 28,30 which moves the material further into the facility for storage or usage. The empty 44 containers are moved into the AGV trailer operation area 12 by a third conveyor 29 for pick up by the AGVs 14. The system 10 is capable of halting its operation in case of interference. Examples of interference are unauthorized entry into the trailers 16,17, the aisle 34, or any of the trailers 16,17 being moved out of position. Operator intervention may be needed in such interferences to resolve the problem and restart the operation. The need for an operator is minimal in this system 10, as this is a truly automatic material handling system.

Other aspects, objects, and advantages of this invention can be obtained from a study of the drawings, the disclosure, and the appended claims.

We claim:

1. A system for loading and unloading a mobile structure with at least one automatic guided vehicle (AGV), said system comprising:
    means for detecting said mobile structure being in position and arranged and oriented for loading and unloading, and for delivering a signal in response to said mobile structure being in position and arranged and oriented for loading and unloading;
    means for navigating said AGV inside said mobile structure;
    means for monitoring traffic and delivering a signal in response to unauthorized traffic being present; and
    means for receiving said traffic monitoring signal and halting said AGV in response to receiving said traffic monitoring signal.

2. A system for loading material into a second trailer, unloading material from a first trailer and transferring said material between at least one pick-up and drop-off location spaced from said trailers, said first and second trailers being parked at first and second docks, respectively, of a loading dock area and said loading and unloading being performed by at least one automatic guided vehicle (AGV), said system comprising:
    means for detecting said first trailer being parked at said first dock and responsively delivering a first docking signal;
    means for detecting said second trailer being parked at said second dock and responsively delivering a second docking signal;
    means for monitoring traffic and delivering a traffic monitoring signal in response to traffic entering the loading dock area;
    means for controlling the flow of traffic entering said area;
    means for detecting the presence of material at said pick-up and drop-off location and delivering a material signal in response to said material being present;
    controller means for receiving said first and second docking signals, said material signal, and said traffic monitoring signal, accounting for the amount of material in said first and second trailers and directing said AGV to transfer material in response to said first and second signals being received, said traffic monitoring signal being absent and said material signal being received.

3. A system for loading material into a second trailer, unloading material from a first trailer and transferring said material between the trailers and a plurality of conveyors, said first and second trailers being parked at first and second docks respectively, said docks having doors, said material handling system using an automatic guided vehicle (AGV), and said AGV navigating by sighting a plurality of unique landmarks, said system comprising:
    means for sensing said first trailer being parked at said first dock and said first trailer door being open and responsively delivering a first trailer signal;
    means for sensing said second trailer being parked at said second dock and said second trailer door being open and responsively delivering a first trailer signal;
    means for monitoring traffic and delivering a traffic monitoring signal in response to traffic entering the loading dock area;
    means for controlling the flow of traffic entering said area;
    means for detecting the absence and presence of material on said conveyors and delivering a material signal in response to said material being present;
    controller means for receiving said first and second docking signals, said material signal, and said traffic monitoring signal, accounting for the amount of material in said first and second trailers and directing said AGV to pick up and deposit material in response to said first and second signals being received, said traffic monitoring signal being absent and said material signal being received.

4. The system, as set forth in claim 3, wherein said traffic monitoring means monitors all pedestrian, operator driven vehicle and automatic guided vehicle traffic and controls said automatic guided vehicle traffic.

5. The system, as set forth in claim 4, wherein said controller means halts said AGV in response to said traffic monitoring means detecting unauthorized entry into said trailers.

6. The system, as set forth in claim 5, wherein said traffic monitoring means includes means for signaling traffic to halt other than AGV traffic.

7. The system, as set forth in claim 6, wherein said traffic monitoring means includes at least one optical sensor.

8. The system, as set forth in claim 6, wherein said traffic controlling means includes at least one traffic light signal.

9. The system, as set forth in claim 3, wherein said controller means includes means for navigating said AGV and reorienting the direction of said AGV travel inside said trailers.

10. The system, as set forth in claim 9, wherein said first and second trailers include a plurality of unique landmarks being adapted for AGV navigation inside said trailers.

11. The system, as set forth in claim 3, wherein said material are housed in containers, and said AGV unloads full containers from said first trailer, and loads empty containers into said second trailer.

12. The system, as set forth in claim 11, wherein said plurality of conveyors includes first and second conveyors and wherein said AGV deposits full containers onto one of the first and second conveyors, and picks up empty containers from said other of said first and second conveyors.

13. The system, as set forth in claim 3, wherein said material is housed in racks, and said AGV unloads full racks from said first trailer, and loads empty racks into said second trailer.

14. The system, as set forth in claim 13, wherein said plurality of conveyors includes first and second conveyors, said AGV depositing full racks onto one of the first and second conveyors, and picking up empty racks from the other of said first and second conveyors.

15. The system, as set forth in claim 3, wherein each of said AGVs further include a fork lift.

16. The system, as set forth in claim 3, wherein an initial condition calls for said first trailer containing a fixed amount of material, and said second trailer being empty.

17. The system, as set forth in claim 16, wherein said controller means decrements from said fixed amount as material is unloaded from said first trailer, and increments from zero as material is loaded into said second trailer.

18. A method for loading material into a second trailer and unloading material from a first trailer and transferring said material to and from at least one pick-up and drop-off location outside of said first and second trailers, said first and second trailers being parked at first and second docks, respectively, said loading and unloading being performed by at least one automatic guided vehicle (AGV), and said AGV navigating by sighting a plurality of unique landmarks, said method comprising the steps of:
  detecting said first trailer being parked at said first dock;
  detecting said second trailer being parked at said second dock;
  monitoring and controlling traffic;
  detecting absence and presence of material at said pick-up and drop-off location;
  accounting for the amount of material in said first and second trailers; and
  directing said AGV to transfer material in response to said detecting means, monitoring means, and accounting means.

19. A method for loading a number of containers into a second trailer and unloading a number of containers from a first trailer and transferring said containers to and from at least two conveyors, said first and second trailers being parked at first and second docks respectively, said docks having doors, said material handling using at least one automatic guided vehicle (AGV), and said AGV navigating by sighting a plurality of unique landmarks, comprising the steps of:
  sensing said first and second trailers being parked in position;
  sensing and monitoring traffic conditions continuously;
  directing said AGV to unload containers from said first trailer;
  detecting unauthorized entry of said first trailer continuously;
  entering said first trailer and picking up a container from said first trailer;
  decrementing and recording the number of containers left in said trailer;
  detecting absence of containers on said first conveyor;
  directing said AGV to deposit the container onto said first conveyor;
  detecting presence of a container on said second conveyor;
  directing said AGV to pick up the container from said second conveyor;
  directing said AGV to load said container onto said second trailer;
  detecting unauthorized entry of said second trailer continuously;
  entering said second trailer and depositing the container into said second trailer; and
  incrementing and recording the number of containers in said second trailer.

20. A system for loading and unloading a plurality of rows of containers in a mobile structure having spaced apart walls and being docked at a loading dock of a facility, said system comprising:
  a plurality of targets mounted at spaced apart locations on the walls of the mobile structure and lining said walls;
  a free ranging automatic guide vehicle adapted to enter said mobile structure, sight the targets in the mobile structure which are visible and unblocked by the containers, and realign itself with respect to the sighted targets irrespective of the position of the mobile structure at the loading dock;
  means for detecting said mobile structure being at said loading dock and ready for entry by said automatic guided vehicle and delivering a signal in response to said mobile structure being present and ready for entry;
  means for receiving said signal and commanding said automatic guided vehicle to enter said mobile structure.

* * * * *